(12) United States Patent
Kuwabara et al.

(10) Patent No.: US 10,723,055 B2
(45) Date of Patent: Jul. 28, 2020

(54) POLYESTER-BASED RESIN FOAM AND METHOD FOR PRODUCING RESIN COMPOSITE

(71) Applicant: SEKISUI PLASTICS CO., LTD., Osaka (JP)

(72) Inventors: Yusuke Kuwabara, Nara (JP); Kazutoshi Hitomi, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 335 days.

(21) Appl. No.: 15/323,762

(22) PCT Filed: Sep. 16, 2015

(86) PCT No.: PCT/JP2015/076329
§ 371 (c)(1),
(2) Date: Jan. 4, 2017

(87) PCT Pub. No.: WO2016/052207
PCT Pub. Date: Apr. 7, 2016

(65) Prior Publication Data
US 2017/0144355 A1    May 25, 2017

(30) Foreign Application Priority Data

Sep. 29, 2014 (JP) ................. 2014-198419

(51) Int. Cl.
*B29C 48/00*    (2019.01)
*C08J 9/36*    (2006.01)
(Continued)

(52) U.S. Cl.
CPC .......... *B29C 48/0021* (2019.02); *B29C 48/00* (2019.02); *B29C 48/0012* (2019.02); *B29C 48/0019* (2019.02); *B32B 5/022* (2013.01); *B32B 5/024* (2013.01); *B32B 5/10* (2013.01); *B32B 5/18* (2013.01); *B32B 5/20* (2013.01); *B32B 5/245* (2013.01); *B32B 5/26* (2013.01); *B32B 7/04* (2013.01); *B32B 27/065* (2013.01); *B32B 27/08* (2013.01); *B32B 27/28* (2013.01); *B32B 27/281* (2013.01); *B32B 27/283* (2013.01); *B32B 27/286* (2013.01); *B32B 27/308* (2013.01); *B32B 27/32* (2013.01); *B32B 27/34* (2013.01); *B32B 27/36* (2013.01); *B32B 27/38* (2013.01); *B32B 27/40* (2013.01); *B32B 27/42* (2013.01); *B32B 33/00* (2013.01); *B32B 37/14* (2013.01); *B32B 38/004* (2013.01); *B32B 38/0012* (2013.01); *C08J 9/141* (2013.01); *C08J 9/36* (2013.01); *B29C 48/09* (2019.02); *B29K 2067/00* (2013.01); *B29K 2105/04* (2013.01); *B29K 2105/06* (2013.01); *B29L 2009/00* (2013.01); *B32B 2038/0064* (2013.01); *B32B 2250/02* (2013.01); *B32B 2250/03* (2013.01); *B32B 2260/021* (2013.01); *B32B 2260/023* (2013.01); *B32B 2260/046* (2013.01); *B32B 2262/02* (2013.01); *B32B 2262/0253* (2013.01); *B32B 2262/0269* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2264/0257* (2013.01); *B32B 2264/10* (2013.01); *B32B 2264/101* (2013.01); *B32B 2264/104* (2013.01); *B32B 2266/0214* (2013.01); *B32B 2266/0221* (2013.01); *B32B 2266/0264* (2013.01); *B32B 2270/00* (2013.01); *B32B 2272/00* (2013.01); *B32B 2305/022* (2013.01); *B32B 2305/08* (2013.01); *B32B 2307/21* (2013.01); *B32B 2307/30* (2013.01); *B32B 2307/306* (2013.01); *B32B 2307/3065* (2013.01); *B32B 2307/50* (2013.01); *B32B 2307/51* (2013.01); *B32B 2307/538* (2013.01); *B32B 2307/712* (2013.01); *B32B 2307/714* (2013.01); *B32B 2307/718* (2013.01); *B32B 2307/72* (2013.01); *B32B 2307/732* (2013.01); *B32B 2307/746* (2013.01); *B32B 2367/00* (2013.01); *B32B 2457/00* (2013.01); *B32B 2603/00* (2013.01);
(Continued)

(58) Field of Classification Search
CPC ............ B29C 47/0064; B29C 48/0012; B29C 48/0021; B32B 5/18
USPC ........................................................ 264/263
See application file for complete search history.

(56) References Cited

U.S. PATENT DOCUMENTS 4,510,031 A * 4/1985 Matsumura ............ C08J 9/0061
521/50.5
9,643,380 B2 * 5/2017 Oyabu ...................... B32B 5/02
(Continued)

FOREIGN PATENT DOCUMENTS

EP    1879056 A1    1/2008
JP    H05-112667 A    5/1993
(Continued)

OTHER PUBLICATIONS

International Search Report issued with respect to Application No. PCT/JP2015/076329, dated Dec. 28, 2015.
(Continued)

*Primary Examiner* — Matthew J Daniels
*Assistant Examiner* — Hana C Page
(74) *Attorney, Agent, or Firm* — Greenblum & Bernstein, P.L.C.

(57) ABSTRACT

A resin composite having excellent strength is easily produced by using a resin foam having a specific surface roughness (Ra) as the core material of the resin composite.

1 Claim, No Drawings

(51) Int. Cl.
| | |
|---|---|
| *B32B 33/00* | (2006.01) |
| *C08J 9/14* | (2006.01) |
| *B32B 37/14* | (2006.01) |
| *B32B 38/00* | (2006.01) |
| *B32B 5/02* | (2006.01) |
| *B32B 27/06* | (2006.01) |
| *B32B 27/38* | (2006.01) |
| *B32B 27/08* | (2006.01) |
| *B32B 27/32* | (2006.01) |
| *B32B 27/28* | (2006.01) |
| *B32B 27/34* | (2006.01) |
| *B32B 5/24* | (2006.01) |
| *B32B 27/30* | (2006.01) |
| *B32B 27/40* | (2006.01) |
| *B32B 5/26* | (2006.01) |
| *B32B 5/20* | (2006.01) |
| *B32B 7/04* | (2019.01) |
| *B32B 27/42* | (2006.01) |
| *B32B 5/10* | (2006.01) |
| *B32B 5/18* | (2006.01) |
| *B32B 27/36* | (2006.01) |
| *B29K 105/04* | (2006.01) |
| *B29C 48/09* | (2019.01) |
| *B29K 67/00* | (2006.01) |
| *B29K 105/06* | (2006.01) |
| *B29L 9/00* | (2006.01) |

(52) U.S. Cl.
CPC ....... *B32B 2605/00* (2013.01); *B32B 2605/08* (2013.01); *B32B 2605/12* (2013.01); *C08J 2201/03* (2013.01); *C08J 2203/14* (2013.01); *C08J 2203/182* (2013.01); *C08J 2367/02* (2013.01)

(56) References Cited

U.S. PATENT DOCUMENTS

2009/0068402 A1\*  3/2009  Yoshida .................. B29C 44/22
                                              428/141
2009/0148698 A1   6/2009  Kawaguchi et al.
2012/0211912 A1   8/2012  Kawaguchi et al.
2014/0199515 A1   7/2014  Oyabu

FOREIGN PATENT DOCUMENTS

| JP | H08-311226 A | 11/1996 |
| JP | 2000-158547 A | 6/2000 |
| JP | 2006-35671 A | 2/2006 |
| JP | 2014-28920 A | 2/2014 |
| JP | 2014-80022 A | 5/2014 |
| JP | 6129037 B | 4/2017 |
| KR | 2000-0077235 A | 12/2000 |
| TW | 201402311 A | 1/2014 |
| WO | 2007/074773 A1 | 7/2007 |

OTHER PUBLICATIONS

Korean Office Action issued with respect to Korean Application No. 2017-7004989, dated Jul. 13, 2018.
Official Communication issued in European Patent Office (EPO) Patent Application No. 15846419.8, dated Mar. 28, 2018.
International Preliminary Report on Patentability issued with respect to Application No. PCT/JP2015/076329, dated Apr. 4, 2017.
Office Action issued in Chinese Application No. 201580045866.7 dated Feb. 28, 2019 (with English machine translation).

\* cited by examiner

POLYESTER-BASED RESIN FOAM AND METHOD FOR PRODUCING RESIN COMPOSITE

CROSS-REFERENCE TO RELATED APPLICATIONS

The present application claims the priority based on Japanese Patent Application No. 2014-198419, which is incorporated herein by reference.

TECHNICAL FIELD

The present invention relates to a method for producing a resin composite in which two resin members of a core material and a fiber-reinforced resin sheet are integrally laminated, and a polyester-based resin foam which is utilized as the core material.

BACKGROUND TECHNOLOGY

In the past, a fiber-reinforced resin (FRP) sheet has widely been used as a member for constituting a body of ships and freight cars.

The fiber-reinforced resin sheet usually comprises, as a substrate sheet, a woven fabric or a non-woven fabric consisting of a fiber having excellent strength such as a glass fiber, in which this substrate sheet is impregnated with a resin.

For this reason, the fiber-reinforced resin sheet has excellent strength, as compared with a general resin sheet which is not reinforced with a fiber.

In recent years, it has been studied that a resin composite having both excellent strength and lightness is prepared by integrally laminating such a fiber-reinforced resin sheet with a core material consisting of a resin foam (see Patent Document 1 below).

In this kind of the resin composite, a surface thereof is provided with a fiber-reinforced resin layer having high strength, which is formed of the fiber-reinforced resin sheet, and a lightweight resin foam is used in a core material.

For this reason, this kind of the resin composite has expanded its intended use, in the field in which lightness and high mechanical strength are required, such as a blade of a windmill for wind power generation, a case for electronic equipment, and an automobile component.

PRIOR ART DOCUMENTS

Patent Documents

Patent Document 1: Japanese Unexamined Patent Application, First Publication No. 2014-028920

SUMMARY OF THE INVENTION

Problem to be Solved by the Intention

The substrate sheet of the fiber-reinforced resin sheet constituting the resin composite is usually impregnated more easily with a resin, in the case where the substrate sheet is a non-woven fabric.

On the other hand, when the substrate sheet is a woven fabric, strength of the fiber-reinforced resin layer is easily increased.

However, even when the fiber-reinforced resin sheet in which the substrate sheet is a woven fabric is used, if fibers of the substrate sheet are brought into the disordered state at lamination with the core material, sufficient strength may not be exerted in the resin composite, and there is a demand for solutions.

An object of the present invention is to satisfy such a demand, and to provide a resin composite having excellent strength.

Means for Solving the Problem

The inventors of the present invention intensively studied to solve the aforementioned problems, and found out that a generally used core material is prepared at the conditions under which a roughness of a surface is increased, in view of the anchoring effect and the like.

The inventors also found that the resin composite may not exert sufficiently excellent strength, due to a high surface roughness of the core material.

Then, the inventors found out that the aforementioned problems can be solved by imparting the predetermined surface texture to the core material when a polyester-based resin is used as a main raw material of the core material, resulting in completion of the present invention.

That is, a polyester-based resin foam of the present invention for solving the aforementioned problems is a polyester-based resin foam for use in forming a resin composite in which a core material including a resin foam and a fiber-reinforced resin sheet are integrally laminated, and for use as the core material, wherein the fiber-reinforced resin sheet comprises a substrate sheet including a fiber woven fabric and a resin impregnated in the substrate sheet, and a surface on which the fiber-reinforced resin sheet is laminated has a surface roughness (Ra) of 2.5 µm or less.

Additionally, a method for producing a resin composite of the present invention for solving the aforementioned problems is a method for producing a resin composite, comprising performing a laminating step of using a fiber-reinforced resin sheet and a core material including a resin foam, and integrally laminating the core material and the fiber-reinforced resin sheet to form a resin composite, wherein the fiber-reinforced resin sheet comprises a substrate sheet including a fiber woven fabric and a resin impregnated in the substrate sheet, and the core material is a polyester-based resin foam having a surface roughness (Ra) of 2.5 µm or less, and in the laminating step, the fiber-reinforced resin sheet is laminated on a surface of the polyester-based resin foam, the surface having the surface roughness (Ra).

In addition, a term of a "surface roughness (Ra)" in the present specification means an arithmetic average roughness (Ra) defined in JIS B 0601-2013, unless otherwise indicated.

Effects of Invention

In accordance with the present invention, a resin composite having excellent strength can be provided.

Best Mode for Carrying Out Invention

Embodiments of the present invention will be explained below.

First, a resin composite will be explained.

The resin composite in the embodiment of the present invention is a resin composite, in which a fiber-reinforced resin sheet and a core material including a polyester-based resin foam are integrally laminated.

The fiber-reinforced resin sheet comprises a substrate sheet including a fiber woven fabric and a resin impregnated in the substrate sheet.

The resin composite has a structure, in which a surface of the core material is provided with the fiber-reinforced resin layer, with the fiber-reinforced resin sheet.

Herein, the core material include, for example, a polyester-based resin expanded sheet (hereinafter, also referred to as simply "expanded sheet") and a bead expanded molded article obtained by in-mold molding polyester-based resin expandable beads.

An embodiment of the present invention will be explained below with as an example of mainly the case where the core material is the explained sheet.

An expanded sheet for constituting the core material will be explained below.

The expanded sheet is preferably obtained by extrusion foaming a polyester-based resin composition comprising a polyester-based resin as a main component, in view of production efficiency.

At least one side of the expanded sheet has a surface roughness (Ra) of 2.5 µm or less.

The expanded sheet is used to laminate the fiber-reinforced resin sheet on a surface having such a surface roughness.

In addition, in a general extrusion foaming method, it is difficult to prepare the expanded sheet have the surface roughness (Ra) of 2.5 µm or less.

Thus, it is preferable that once after the expanded sheet is prepared in the state where the surface roughness (Ra) exceeds 2.5 µm, the expanded sheet is further treated so that the surface roughness (Ra) becomes 2.5 µm or less.

In addition, it is also difficult to directly obtain the core material having the surface roughness (Ra) of 2.5 µm or less in case of the bead expanded molded article.

As a polyester-based resin as a main raw material of the expanded sheet, for example, a linear polyester having a high molecular weight, which is obtained by a condensation reaction between a dicarboxylic acid and a polyhydric alcohol, can be adopted.

An example of the polyester-based resin includes an aromatic polyester-based resin.

The polyester-based resin may be an aliphatic polyester-based resin such as a polylactic acid-based resin.

The aromatic polyester-based resin usually comprises an aromatic dicarboxylic acid component and a diol component.

Examples of the aromatic polyester-based resin include a polyethylene terephthalate resin, a polypropylene terephthalate resin, a polybutylene terephthalate resin, a polycyclohexanedimethylene terephthalate resin, a polyethylene naphthalate resin, a polybutylene naphthalate resin, and the like.

It is preferable that the aromatic polyester-based resin to be comprised in the expanded sheet is a polyethylene terephthalate resin.

In addition, the aromatic polyester-based resins may be used alone, or two or more of them may be used together.

The aromatic polyester-based resin may comprise a trivalent or more polyvalent carboxylic acid or an anhydride thereof as a constituent component, in addition to the aromatic dicarboxylic acid component and the diol component.

Specifically, the aromatic polyester-based resin may comprise a tricarboxylic acid such as trimellitic acid, or a tetracarboxylic acid such as pyromellitic acid as a constituent component.

The aromatic polyester-based resin may comprise a trihydric or more polyhydric alcohol such as a triol such as glycerin and a tetraol such as pentaerythritol, in addition to the aromatic dicarboxylic acid component and the diol component.

In addition, the aromatic polyester-based resin to be comprised in the expanded sheet may be a recycled material which was recovered and reproduced from a used pet bottle.

The aromatic polyester-based resin to be comprised in the expanded sheet may be partially crosslinked in such a range that thermoplasticity is exerted.

Examples of a crosslinking agent for crosslinking the aromatic polyester-based resin include an acid dianhydride such as pyromellitic anhydride, a polyfunctional epoxy compound, an oxazoline compound, and an oxazine compound.

In addition, the crosslinking agents may be used alone, or two or more of them may be used together.

When the polyethylene terephthalate resin is crosslinked by the crosslinking agent, the crosslinking agent together with the polyethylene terephthalate resin is supplied into an extruder, and the resin may be dynamically crosslinked in the extruder.

When an amount of the crosslinking agent to be supplied to the extruder is too small, the melt viscosity of the polyethylene terephthalate resin may be not sufficient.

Further, when the melt viscosity of the polyethylene terephthalate resin is too low, breakage of cells may easily occur when the expanded sheet is extrusion foamed.

On the other hand, when an amount of the crosslinking agent is too large, the melt viscosity of the polyethylene terephthalate resin may become too high.

When the melt viscosity of the polyethylene terephthalate resin becomes too high for example, when the expanded sheet is produced by extrusion foaming, a load of an extruder becomes too high, and extrusion foaming itself becomes difficult.

Accordingly, when a base resin of a resin composition for constituting the core material is a crosslinked polyethylene terephthalate resin, it is preferable that crosslinking is performed using a ratio of 0.01 parts by mass or more and 5 parts by mass or less of the crosslinking agent based on 100 parts by mass of the polyethylene terephthalate resin.

In addition, the ratio is more preferably 0.1 parts by mass or more and 1 parts by mass or less.

As the polylactic acid-based resin, a resin obtained by polymerization of lactic acid by ester bonding can be used.

When a thermoplastic resin to be comprised in the expanded sheet is a polylactic acid-based resin, in view of commercially availability and impartation of expandability, it is preferable that the polylactic acid-based resin is a copolymer of D-lactic acid (D isomer) and L-lactic acid (L isomer), a homopolymer of any one of D-lactic acid or L-lactic acid, and a ring-opened polymer of one or two or more lactides selected from the group consisting of D-lactide, L-lactide, and DL-lactide.

In addition, the polylactic acid-based resins may be used alone, or two or more of them may be used together.

The polylactic acid-based resin may comprise an aliphatic polyhydric alcohol as a monomer component other than lactic acid.

Examples of the monomer component include aliphatic hydroxycarboxylic acids such as glycolic acid, hydroxybutyric acid, hydroxyvaleric acid, hydroxycaproic acid, and hydroxypentanoic acid; aliphatic polyvalent carboxylic acids such as succinic acid, adipic acid, suberic acid, sebacic acid, dodecanedicarboxylic acid, succinic anhydride, adipic anhydride, trimesic acid, propanetricarboxylic acid, pyromellitic acid, and pyromellitic anhydride; ethylene glycol, 1,4-butanediol, 1,6-hexanediol, 1,4-cyclohexanedimethanol, neopentyl glycol, decamethylene glycol, glycerin, trimethylolpropane, pentaerythritol, and the like.

The polylactic acid-based resin may comprise a functional group such as an alkyl group, a vinyl group, a carbonyl group, an aromatic group, an ester group, an ether group, an aldehyde group, an amino group, a nitrile group, and a nitro group.

The polylactic acid-based resin may be crosslinked by an isocyanate-based crosslinking agent or the like, and may comprise a bond other than an ester bond on a main chain or a side chain.

In addition, the expanded sheet can be prepared by appropriately blending an expanding agent and a cell nucleating agent into such a base resin to prepare a polyester-based resin composition suitable for extrusion foaming, and extrusion foaming the composition with an extruder mounted with a circular die or a flat die.

As the expanding agent, a chemical expanding agent or a physical expanding agent can be appropriately adopted.

Examples of the chemical expanding agent include azodicarbonamide, dinitrosopentamethylenetetramine, hydrazoyldicarbonamide, sodium bicarbonate, and the like.

In addition, the chemical expanding agents may be used alone, or two or more of them may be used together.

Examples of the physical expanding agent include saturated aliphatic hydrocarbons such as propane, normal butane, isobutane, normal pentane, isopentane, and hexane, ethers such as dimethyl ether and methyl chloride, fluorocarbons such as 1,1,1,2-tetrafluoroethane, 1,1-difluoroethane and monochlorodifluoromethane, carbon dioxide, nitrogen, and the like.

Among them, it is preferable that the expanding agent to be used for preparing the expanded sheet is dimethyl ether, propane, normal butane, isobutane, carbon dioxide or the like.

The expanding agent is more preferably propane, normal butane, isobutane or the like and particularly preferably normal butane or isobutane.

In addition, the physical expanding agents may be used alone, or two or more of them may be used together.

Further, the chemical expanding agent and the physical expanding agent may be used together.

Examples of the cell nucleating agent include inorganic compound particles such as talc, mica, silica, diatomaceous earth, aluminum oxide, titanium oxide, zinc oxide, magnesium oxide, magnesium hydroxide, aluminum hydroxide, calcium hydroxide, potassium carbonate, calcium carbonate, magnesium carbonate, potassium sulfate, barium sulfate, and glass beads, and organic compound particles such as polytetrafluoroethylene.

Additionally, the polyester-based resin composition for preparing the expanded sheet can comprise various additives such as an antioxidant, an antiaging agent, a weather-resistant agent, an antibacterial agent, a flame retardant, an antistatic agent, an ant-repellent, a rat-repellent, and a pigment.

The expanded sheet usually having the thickness of 0.5 to 5 mm can be adopted, and the expanded sheet having the apparent density of 0.01 to 0.7 g/cm$^3$ can be adopted as the core material.

In the fiber-reinforced resin sheet for forming a fiber-reinforced resin layer with respect to the expanded sheet, the base sheet and the resin are not particularly limited.

Examples of a fiber constituting the substrate sheet of the fiber-reinforced resin sheet include metal fibers such as a stainless fiber and a steel fiber, inorganic fibers such as a glass fiber, a carbon fiber, a boron fiber, a silicon carbide fiber, an alumina fiber, a tyranno fiber, a basalt fiber, and other ceramic fiber; organic fibers such as an aramid fiber, a polyethylene fiber, and a polyparaphenylene benzoxazole (PBO) fiber; and the like.

Among them, since a fiber constituting the substrate sheet has excellent mechanical strength and heat resistance, a carbon fiber, a glass fiber, an aramid fiber, and the like are preferable, and a carbon fiber is more preferable.

As the substrate sheet, for example, a paralleled yarn obtained by paralleling a plurality of the fibers, or a plane material obtained by subjecting a twisted yarn to plain weaving, twill weaving, or sateen weaving can be adopted.

The substrate sheet may be constructed of only one plane material, or may be constructed by laminating a plurality of plane materials.

Additionally, it is not necessary that the fiber-reinforced resin layer is constructed of only one fiber-reinforced resin sheet, and it is possible to form the fiber-reinforced resin layer of a plurality of fiber-reinforced resin sheets.

In addition, examples of the resin which is impregnated in the substrate sheet and is utilized for forming the fiber-reinforced resin layer together with the substrate sheet are not particularly limited to, but include, for example, a general thermoplastic resin and thermosetting resin.

Examples of the thermoplastic resin include, but are not particularly limited to, an olefin-based resin, a polyester-based resin, a polyamide-based resin, a thermoplastic polyurethane resin, a sulfide-based resin, an acrylic-based resin, and the like.

In addition, the thermoplastic resins may be used alone, or two or more of them may be used together.

In view of adhesiveness with the expanded sheet, as the resin constituting the fiber-reinforced resin sheet, a polyester-based resin is preferable among the thermoplastic resin.

Examples of the thermosetting resin constituting the fiber-reinforced resin sheet include, but are not particularly limited to, an epoxy resin, an unsaturated polyester-based resin, a phenol resin, a melamine resin, a polyurethane resin, a silicone resin, a maleimide resin, a vinyl ester resin, a cyanic acid ester resin, and the like.

The thermosetting resin may be a resin obtained by pre-polymerizing a maleimide resin and a cyanic acid ester resin.

As the thermosetting resin, an epoxy resin and a vinyl ester resin are preferable because heat resistance, elastic modulus, and chemical resistance are excellent.

In addition, the thermosetting resins may be used alone, or two or more of them may be used together.

The content of the resin in the fiber-reinforced resin sheet is preferably 20% by mass or more and 70% by mass or less, and more preferably 30% by mass or more and 60% by mass or less.

In addition, the thickness of the fiber-reinforced resin sheet is preferably 0.02 min or more and 2 mm or less, and more preferably 0.05 mm or more and 1 mm or less.

In order to obtain the resin composite using such a fiber-reinforced resin sheet and the expanded sheet, for example, the following (a) step to (e) step may be carried out in this order.

(a) Sheet Preparing Step

A sheet preparing step of melt-kneading a polyester-based resin composition comprising an expanding agent in an extruder mounted with a circular die, extruding the melt kneading product in a cylindrical shape through an annular discharge port of the circular die, expanding the melt kneading product to form a cylindrical expanded sheet, and continuously cutting this cylindrical expanded sheet at one place or a plurality of places in the circumferential direction while drawing the sheet with a drawing machine towards a downstream side in the extruding direction to prepare a long belt-like expanded sheet.

(b) Curing Step

A curing step of storing the expanded sheet obtained in the sheet preparing step at a predetermined temperature for a predetermined term, replacing the expanding agent remaining in the interior with the outside air, and at the same time, relaxing a strain generated at extrusion foaming.

(c) Sheet Smoothing Step

A sheet smoothing step of heating and pressurizing the expanded sheet after the curing step by heat press or the like, to smooth a surface more than before pressing.

(d) Pre-Molded Article Preparing Step

A pre-molded article preparing step of temporarily adhering a fiber-reinforced resin sheet to a surface of the expanded sheet which was processed to a predetermined size by outer shape processing to prepare a pre-molded article.

(e) Laminating Step

A laminating step of charging a molding die having a cavity space corresponding to a product shape with the pre-molded article, heating and pressurizing this with a heat press or an autoclave to integrally laminate a core material including the expanded sheet and a fiber-reinforced resin sheet, to prepare a resin composite in which a fiber-reinforced resin layer is formed on a surface of the core material.

In addition, upon preparing of the resin composite, it is not necessary to carry out all the steps of (a) to (e).

Also, upon preparing of the resin composite, other step may be further added to the steps of (a) to (e).

In the laminating step, in order not to cause disorder of fibers constituting the substrate sheet of the fiber-reinforced resin sheet, it is important that a surface of the core material constituting the pre-molded article is smooth and exhibits good sliding property to the fiber-reinforced resin sheet.

Specifically, it is important for suppressing disorder of fibers of the substrate sheet that the core material constituting the pre-molded article has the surface roughness (Ra) of 2.5 μm or less.

On the other hand, it is difficult to obtain the expanded sheet having excellent surface smoothness, in the sheet preparing step.

When one tries to obtain the expanded sheet having excellent surface smoothness in the sheet preparing step, various restrictions of the producing conditions may deteriorates a production efficiency of the expanded sheet.

Accordingly, it is preferable to prepare the expanded sheet in the state where the surface roughness (Ra) exceeds 2.5 μm, in the sheet preparing step.

In addition, also when the core material is a bead expanded molded article, it is important for obtaining the good resin composite that once after a molded article in the state where the surface roughness (Ra) exceeds 2.5 μm is prepared, the same smoothing step as this sheet smoothing step is carried out to adjust the surface roughness (Ra) of the molded article at 2.5 μm or less.

That is, the smoothing step which is carried out for the expanded sheet or the bead expanded molded article in the embodiment of the present invention renders the surface roughness (Ra) of the core material including the expanded sheet or the bead expanded molded article to be 2.5 μm or less.

Examples of a specific method for carrying out the smoothing step include a method of abutting a mirror-processed metal plate against, a surface of the expanded sheet or the bead expanded molded article to perform hot pressing, or abutting a resin film having a smooth surface, which is composed of a resin having a higher melting point than that of the polyester-based resin, against a surface of the expanded sheet or the bead expanded molded article to perform hot pressing.

Examples of a specific method of carrying out the smoothing step also include a method of using one pair of mirror-processed metal rollers to provide a gap slightly shorter than the thickness of the expanded sheet or the bead expanded molded article between the metal rollers, and passing the expanded sheet or the bead expanded molded articles between the metal rollers to smooth a surface of the expanded sheet or the bead expanded molded article.

In addition, since excessive effort is required in order to adjust the surface roughness (Ra) at an extremely small value, the core material to be supplied to the laminating step has the surface roughness (Ra) of preferably 0.5 μm or more, and more preferably 1.0 μm or more.

In addition, the surface roughness (Ra) of the expanded sheet can be obtained, for example, as follows, (Method for Obtaining Surface Roughness (Ra))

The surface roughness is measured in accordance with JIS B0601:2013.

Specifically, the surface roughness is measured using, as a measuring device, "double scan high precision laser measuring equipment LT-9500, LT-9010M" manufactured by KEYENCE CORPORATION and, as a data processing software, "non-contact contour, shape and roughness measuring system MAP-2DS" manufactured by COMS Co., Ltd.

Regarding the measuring conditions, a measurement range is set at 18,000 μm, a measurement pitch is set at 5 μm, a measurement rate is set at 1,000 μm/sec, an assessment length is set at 12.5 mm, a standard length is set at 2.5 mm, a light quantity is set at 40, and an average filter of 2, and a noise filter of 1 are adopted.

A test piece is prepared by excising a piece having width 100 mm×length 100 mm×thickness (sheet thickness) from the expanded sheet.

The number of test pieces is 5, and the surface roughness in the flow direction and the width direction of both of a front surface and a rear surface of each test piece is measured.

An arithmetic average roughness (Ra) is obtained by summing up an absolute value of deviation of from an average line to a measurement curve, and averaging the sum with the standard length (n=20).

In addition, the maximum height is obtained from the sum of the height from an average line to a highest summit and the depth up to a lowest valley bottom (n=20).

In addition, the average length (Sm) of a contour curve element of the surface roughness is an arithmetic average of a distance between intersections of an average line and a contour line.

In addition, in the sheet smoothing step, a crystallization degree of the polyester-based resin constituting a surface of the expanded sheet can be improved, by adding heat to a surface of the expanded sheet.

Since in the expanded sheet after this sheet smoothing step, not only a surface is smooth, but also a crystallization degree is improved so that the surface is hard, high sliding property is exerted to the fiber-reinforced resin sheets in the laminating step.

Additionally, since heat resistance of the expanded sheet is improved by carrying out the sheet smoothing step, it becomes hard to cause the dimension change in the expanded sheet during heat curing of the fiber-reinforced sheet.

Accordingly, by carrying out the sheet smoothing step, it becomes easy to form the resin composite having little disorder of fibers.

That is, in a surface layer part of the expanded sheet after the sheet smoothing step, it is preferable that the polyester-based resin has a predetermined crystallization degree or higher, and specifically, it is preferable that the resin has a crystallization degree of 15% or higher.

The crystallization degree a surface layer part of the expanded sheet after the sheet smoothing step can be obtained by performing differential scanning calorimetric analysis (DSC) of a sample which was collected from between a surface of the expanded sheet and up to the depth of about 0.2 mm.

The crystallization degree can be specifically obtained as follows.

(Method for Obtaining Crystallization Degree)

Using a differential scanning calorimeter (product name "Model DSC6220", manufactured by SII Nano Technology Inc.), the sample is filled in the bottom of a measurement container made of aluminum without gaps, and the sample is retained at 30° C. over 2 minutes under the condition of a nitrogen gas flow rate of 20 mL/min.

Thereafter the DSC curve when a temperature of the sample was raised from 30° C. to 290° C. at a rate of 10° C./min is obtained.

Alumina is used as a reference material during that time.

The crystallization degree is obtained by dividing a difference between the melting heat amount (mJ/mg) obtained from an area of a melting peak and the crystallization heat amount (mJ/mg) obtained from an area of a crystallization peak by the theoretical melting heat amount $\Delta H_0$ of the perfect crystal of a crystallizable thermoplastic resin.

For example. $\Delta H_0$ of polyethylene terephthalate is 140.1 mJ/mg.

The crystallization degree of the sample is calculated based on the following equation:

Crystallization degree (%)=(|melting heat amount (mJ/mg)|−|crystallization heating amount (mJ/mg)|)/$\Delta H_0$(mJ/mg)×100

The calculation is performed at the number n of the samples of around 5, an arithmetic average value is adopted as the crystallization degree of a surface layer part of the expanded sheet.

In the resin composite prepared by the aforementioned production method, it is not necessary that an entire surface of the core material is covered with the fiber-reinforced resin sheet.

In the resin composite, for example, when the core material is the expanded sheet, the fiber-reinforced resin sheet may be laminated on both sides of the expanded sheet, or the fiber-reinforced resin sheet may be laminated on only one side of the expanded sheet.

According to the aforementioned production method, the resin composite in which disorder of fibers of the substrate sheet is little and an entire surface area has uniform strength can be more securely obtained.

In addition, in the above description, the case where the expanded sheet is used as the core material of the resin composite is discussed as an example, but the core material of the resin composite of the present invention may be a bead expanded molded article or the like.

Also, in the embodiment of the present invention, the resin composite and the production method thereof are exemplified as described above, but the resin composite and the production method thereof of the present invention are not limited to the above exemplification, and a variety of modification can be added to the above exemplification.

EXAMPLES

The present invention will be further explained in detail based on Examples below, but the present invention is not limited by them.

Examples 1 and 2

A thermoplastic polyester-based resin composition comprising 100 parts by mass of a polyethylene terephthalate resin (PET, product name "SA135", manufactured by Mitsui Chemicals, Inc., glass transition temperature Tg: 79° C., melting point: 247.1° C., IV value: 0.86), 0.72 parts by mass of talc, and 0.2 part of pyromellitic anhydride was supplied to a single screw extruder having a pore diameter of 65 mm and the L/D ratio of 35, and melt-kneaded at 290° C.

Then, butane comprising 36% by mass of isobutane and 65% by mass of normal butane was pressed into a middle part of the single screw extruder so that the butane became 1.0 parts by mass based on 100 parts by mass of polyethylene terephthalate.

Then, the butane was uniformly dispersed in the thermoplastic polyester-based resin composition, in the single screw extruder.

Thereafter, at the front end of the single screw extruder, after the polyester-based resin composition in the melt state was cooled to 220° C., and then it was extrusion foamed in a cylindrical shape through a circular die mounted at the front end of the single screw extruder to produce a cylindrical body.

A diameter of this cylindrical body was gradually expanded, and the cylindrical body was supplied to a cooling mandrel to cool the body so that a surface temperature thereof became 25° C.

The cylindrical body after cooling was cut over in internal and external circumferential planes (in the direction of the thickness).

Cutting was continuously carried out in the direction of the extruding, and the cylindrical body after cutting was unfolded, thereby obtaining a band-like polyethylene terephthalate expanded sheet.

The obtained polyethylene terephthalate expanded sheet had the thickness of 3.2 mm and the weight per unit area of 900 g/m².

In addition, hereinafter, the surface contacted with the cooling mandrel is called a front surface of the expanded sheet, and the surface on the opposite side is called as a rear surface.

The expanded sheet was placed under the environment at a room temperature of 25° C. immediately after production, and was cured over 48 hours under the same environment.

For the expanded sheet after curing, the following sheet smoothing step was carried out.

A planar square-shaped sheet piece having one side of 640 mm was excised from the expanded sheet.

The excised sheet piece was mounted in a pressing machine provided with a 3.0 mm spacer, and was pressed at a temperature of 140° C. and a pressure of 0.5 MPa for 3 minutes.

Thereafter, the pressed piece was cooled to 30° C. while retaining a pressure, to obtain a surface-smoothed expanded sheet (sheet piece) having the thickness and the weight per unit area described in Table 1.

Examples 3 and 4

In the same manner as in Examples 1 and 2 except that, at a middle part of the single screw extruder, butane comprising 35% by mass of isobutane and 65% by mass of normal butane was pressed into a polyester-based resin composition in the melt state so that the butane became 0.5 parts by mass based on 100 parts by mass of polyethylene terephthalate, a polyethylene terephthalate expanded sheet having the thickness of 2.0 mm and the weight per unit area of 600 g/m² was produced, and an excised sheet piece was mounted and pressed in a pressing machine provided with a 1.5 min spacer, thereby obtaining a surface-smoothed expanded sheet.

Examples 5 and 6

In the same manner as in Examples 1 and 2 except that, at a middle part of the single screw extruder, butane comprising 35% by in mass of isobutane and 65% by mass of normal butane was pressed into a polyester-based resin composition in the melt state so that the butane became 0.3 parts by mass based on 100 parts by mass of polyethylene terephthalate, a polyethylene terephthalate expanded sheet having the thickness of 1.7 mm and the weight per unit area of 500 g/m² was produced, and an excised sheet piece was mounted and pressed in a pressing machine provided with a 1.5 mm spacer, thereby obtaining a surface-smoothed expanded sheet.

Comparative Examples 1 and 2

In the same manner as in Examples 1 and 2, an expanded sheet was produced, but the sheet smoothing step was not performed.

Comparative Example 3 and 4

In the same manner as in Examples 5 and 6, an expanded sheet was produced, but the sheet smoothing step was not performed.

TABLE 1

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Sheet smoothing step | Performed | Performed | Performed | Performed | Performed | Performed | Not performed | Not performed | Not performed | Not performed |
| Surface for measurement | Front surface | Rear surface | Front surface | Rear surface | Front surface | Rear surface | Front surface | Rear surface | Front surface | Rear surface |
| Thickness (mm) | 3.0 | 3.0 | 1.5 | 1.5 | 1.5 | 1.5 | 3.2 | 3.2 | 1.7 | 1.7 |
| Weight per unit area (g/m²) | 900 | 900 | 600 | 600 | 500 | 500 | 900 | 900 | 500 | 500 |
| Arithmetic surface roughness (μm) | 1.20 | 1.85 | 1.19 | 2.21 | 1.35 | 2.41 | 2.85 | 10.31 | 2.59 | 4.67 |
| Crystallization degree (%) | 25 | 24 | 24 | 24 | 95 | 24 | 8 | 10 | 7 | 8 |

In addition, when the formed sheet of Examples 1 to 6 was used as the core material and it was laminated with the fiber-reinforced resin sheet, there was not remarkable disorder in the fibers of the substrate sheet. However, when the expanded sheet of Comparative Examples 1 to 4 was used as the core material and was laminated with the fiber-reinforced resin sheet, there was disorder in a wave shape in the fibers of the substrate sheet at the interfacial side with the core material.

As such the above, it is apparent that the present invention can provide the resin composite having excellent strength.

What is claimed is:

1. A method for producing a resin composite, comprising:
    performing a laminating step of using a fiber-reinforced resin sheet and a core material including a resin foam, and integrally laminating said core material and said fiber-reinforced resin sheet to form the resin composite, wherein
    said fiber-reinforced resin sheet comprises a substrate sheet including a fiber woven fabric and a resin impregnated in said substrate sheet,
    said core material is a polyester-based resin foam having a surface roughness (Ra) of 2.41 μm or less, and
    in the laminating step, said fiber-reinforced resin sheet is laminated on a surface of said polyester-based resin foam, the surface having said surface roughness (Ra),
    wherein said polyester-based resin foam is crosslinked by a crosslinking agent, wherein the crosslinking is performed using a ratio of 0.01 parts by mass or more and 5 parts by mass or less of the crosslinking agent based on 100 parts by mass of the polyester-based resin foam
    performing a sheet preparing step of extrusion foaming a polyester-based resin composition to prepare a polyester-based resin expanded sheet to be used as said core material, and performing a sheet smoothing step of smoothing a surface of said polyester-based resin expanded sheet obtained in the sheet preparing step, in the sheet preparing step, said polyester-based resin expanded sheet having a surface roughness (Ra) exceeding 2.5 μm is prepared, in the sheet smoothing step, a surface of said polyester-based resin expanded sheet is smoothed so that said surface roughness (Ra) becomes 2.41 μm or less, and in the laminating step, said fiber-reinforced resin sheet is laminated on a surface of said polyester-based resin expanded sheet, said surface having been smoothed in the sheet smoothing step.

* * * * *